United States Patent
Yamamoto et al.

(10) Patent No.: US 6,951,149 B2
(45) Date of Patent: Oct. 4, 2005

(54) OUTPUT SHAFT LOCKING DEVICE FOR MULTI-CLUTCH TRANSMISSION AND LOCKING METHOD OF SAME

(75) Inventors: Kazuhiro Yamamoto, Toyota (JP); Koji Naito, Nagoya (JP); Takaya Amano, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 23 days.

(21) Appl. No.: 10/663,668

(22) Filed: Sep. 17, 2003

(65) Prior Publication Data

US 2004/0060378 A1 Apr. 1, 2004

(30) Foreign Application Priority Data

Sep. 26, 2002 (JP) ........................................ 2002-281978

(51) Int. Cl.⁷ ............................................. F16H 63/34
(52) U.S. Cl. ........................ 74/335; 329/330; 329/333; 329/340
(58) Field of Search .......................... 74/329, 330, 333, 74/335, 340

(56) References Cited

U.S. PATENT DOCUMENTS

| | | | |
|---|---|---|---|
| 3,774,474 A | * | 11/1973 | Recker et al. .............. 475/209 |
| 6,499,370 B2 | * | 12/2002 | Bowen ......................... 74/330 |
| 6,675,668 B2 | * | 1/2004 | Schamscha ................... 74/340 |

FOREIGN PATENT DOCUMENTS

| | | |
|---|---|---|
| JP | 2-123454 | 10/1990 |
| JP | 07145862 A | 6/1995 |
| JP | 2000264178 | 9/2000 |
| JP | 2001050392 | 2/2001 |
| JP | 2001280495 | 10/2001 |
| JP | 2004-263708 | * 9/2004 |

* cited by examiner

*Primary Examiner*—Ha Ho
(74) *Attorney, Agent, or Firm*—Oblon, Spivak, McClelland, Maier & Neustadt, P.C.

(57) ABSTRACT

An output shaft locking device for a multi-clutch transmission in which a plurality of rotational mechanisms, each of which is formed by arranging a clutch and a shifting mechanism is series, is provided in parallel between a rotational power input shaft and a rotational power output shaft, and an output shaft locking method. The output shaft locking device includes a locking control device which locks the rotational power output shaft by engaging a shifting gear in each of the shifting mechanisms of at least two of the rotational mechanisms, and engaging each of the clutches of the rotational mechanisms. Thus, it is possible to lock the output shaft so as to fix wheels by engaging the shifting gear without providing a lock mechanism.

16 Claims, 4 Drawing Sheets

FIG. 2A

SHIFT CONTROL

| SHIFT | C1 | C2 | C1 SIDE | | C2 SIDE | |
|---|---|---|---|---|---|---|
| | | | S1 | S3 | S2 | S4 |
| FIRST SPEED | O | × | N | O1 | N | N/O2 |
| SECOND SPEED | × | O | N/I3 | O1/N | N | O2 |
| THIRD SPEED | O | × | I3 | N | N/I4 | O2/N |
| FOURTH SPEED | × | O | I3/I5 | N | I4 | N |
| FIFTH SPEED | O | × | I5 | N | I4/I6 | N |
| SIXTH SPEED | × | O | I5/N | N | I6 | N |
| REVERSE | × | O | N | N/O1 | N | OR |
| NEUTRAL | × | × | N | N | N | N |

FIG. 2B

GEAR ENGAGEMENT CONTROL FOR PARKING

| RANGE | C1 | C2 | C1 SIDE | | C2 SIDE | |
|---|---|---|---|---|---|---|
| | | | S1 | S3 | S2 | S4 |
| A | O | O | N | O1 | N | O2 |
| M | O | O | N | O1 | N | O2 |
| R | O | O | N | O1 | N | OR |
| N | O | O | N | N | N | N |

OUTPUT SHAFT LOCKING DEVICE FOR MULTI-CLUTCH TRANSMISSION AND LOCKING METHOD OF SAME

INCORPORATION BY REFERENCE

The disclosure of Japanese Patent Application No. 2002-281978 filed on Sep. 26, 2002, including the specification, drawings and abstract is incorporated herein by reference in its entirety.

BACKGROUND OF THE INVENTION

1. Field of the Invention

The invention relates to an output shaft locking device and a lock method for a multi-clutch transmission in which a plurality of rotational mechanisms, each of which is formed by arranging a clutch and a shifting mechanism in series, is provided in parallel between a rotational power input shaft and a rotational power output shaft.

2. Description of the Related Art

When parking a vehicle which has a parallel shaft type gear transmission by locking shifting gears, an output shaft of the transmission cannot be locked if a torque converter is provided between a clutch and an engine. Accordingly, a mechanism is known in which a lock gear that is to be engaged with a reverse idle gear is specially provided. In the mechanism, the reverse idle gear is engaged with the lock gear during parking such that an output shaft of a transmission is locked (refer to patent document 1). There is also a mechanism in which an output shaft of a transmission is locked by engaging an engaging member that is specially provided for a shifting gear (refer to patent documents 2 to 4). Further, a mechanism is known in which an input shaft of a transmission is directly locked by a specially provided parking lock mechanism (refer to patent document 5).

There is another type of known mechanism in which a rotational shaft of a transmission is locked by performing double engagement of shifting gears using a select lever, instead of employing the aforementioned specially provided lock mechanism (refer to patent document 6).

[Patent Document 1]
Japanese Patent Laid-Open Publication No. 2001-50392 (FIG. 2, pages 3–4)

[Patent Document 2]
Japanese Patent Laid-Open Publication No. 7-145862 (FIG. 2, pages 3–4)

[Patent Document 3]
Japanese Patent Laid-Open Publication No. 2001-280495 (FIG. 2, pages 4–5)

[Patent Document 4]
Japanese Utility Model Patent Laid-Open Publication No. 2-123454 (FIG. 2, page 1)

[Patent Document 5]
Japanese Patent Laid-Open Publication No. 2000-264178 (FIGS. 1–4, pages 3–6)

[Patent Document 6]
Japanese Patent Laid-Open Publication No. 2000-74214 (FIG. 1 pages 4–5)

When the aforementioned lock mechanism is applied to a twin clutch type transmission in which a plurality of, e.g., two rotational mechanisms, each of which is formed by arranging a clutch and a shifting mechanism in series, is provided in parallel between a rotational power input shaft and a rotational power output shaft, the following problems may occur.

When a structure provided with a lock mechanism is applied to the twin clutch type transmission as mentioned in patent documents 1 to 5, it becomes necessary to further provide a special lock mechanism to the transmission, which is itself already complex. This makes the arrangement of components difficult and increases the weight as well as costs.

In order to solve these problems, it is conceivable that the lock mechanism disclosed in the patent document 6 be applied to the twin clutch type transmission. However, unlike the transmission disclosed in the patent document 6, the twin clutch type transmission includes two clutches and two input shafts therein. Accordingly, it is still unclear how to select a shift for the double engagement, and how to control engagement/disengagement of the two clutches appropriately.

SUMMARY OF THE INVENTION

According to an embodiment of the invention, there is provided an output shaft locking device which appropriately locks a rotational power output shaft by engaging shifting gears, without providing a lock mechanism, in a multi-clutch transmission such as a twin clutch type transmission.

First, an output shaft locking device for a multi-clutch transmission is provided. In the multi-clutch transmission, a plurality of rotational mechanisms, each of which is formed by arranging a clutch and a shifting mechanism in series, is provided in parallel between a rotational power input shaft and a rotational power output shaft. The output shaft locking device includes a locking control device which locks the rotational power output shaft by engaging a shifting gear in each of the shifting mechanisms of at least two of the rotational mechanisms and engaging each of the clutches of the rotational mechanisms.

According to another aspect of the invention, there is provided an output shaft locking method for a multi-clutch transmission. In the multi-clutch transmission, a plurality of rotational mechanisms, each of which is formed by arranging a clutch and a shifting mechanism in series, is provided in parallel between a rotational power input shaft and a rotational power output shaft. The output shaft locking method includes the steps of engaging a shifting gear in each of the shifting mechanisms of at least two of the rotational mechanisms and engaging each of the clutches of the rotational mechanisms, so as to lock the rotational power output shaft.

According to the output shaft locking device and the output shaft locking method for a multi-clutch transmission, when the rotational power output shaft is locked, the shifting gear is engaged in each of the shifting mechanisms of at least two of the rotational mechanisms, and each of the clutches of the rotational mechanisms is engaged. Accordingly, gears whose gear ratios are different from each other are coupled with each other via the clutches. Consequently, the gears cannot rotate in the rotational mechanisms. As a result, the rotational power output shaft cannot rotate.

Thus, it is possible to lock the rotational power output shaft by engaging the shifting gears, without providing a lock mechanism, in the multi-clutch transmission.

In addition, unlike the conventional double engagement method, the shifting gears are engaged in the different rotational mechanisms. As a result, the shifting gear engagement in each of the rotational mechanisms can be used as it is, depending on the type of the engaged shifting gear. Accordingly, when the shifting gear engagement is thus used, control for operation start becomes easier.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which:

FIG. 2A is a table showing states of clutches and sleeves in shift control by the transmission;

FIG. 2B is a table showing states of the clutches and sleeves in engagement control for parking by the transmission;

DETAILED DESCRIPTION OF THE EXEMPLARY EMBODIMENTS

In the following description and the accompanying drawings, the present invention will be described in more detail in terms of exemplary embodiments.

Figure 1:
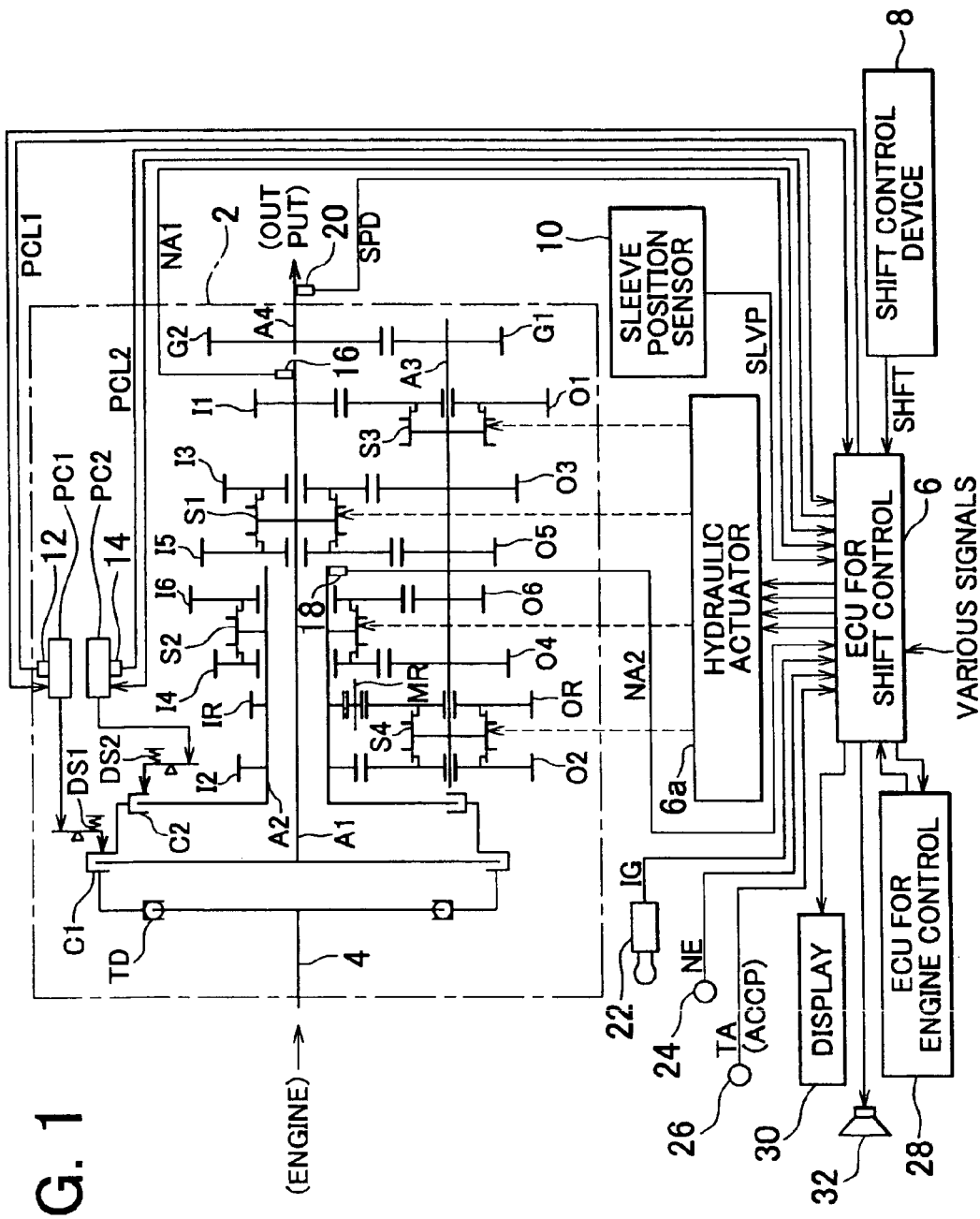
FIG. 1 is a block diagram showing a twin clutch type six speed transmission and a control system thereof, for a vehicle according to a first embodiment of the invention.

Hereafter, a first embodiment will be described. A block diagram in FIG. 1 shows a twin clutch type six speed transmission (i.e., a multi-clutch transmission. Hereinafter, referred to as "transmission") 2 for a vehicle to which the invention is applied, and a control system thereof. In FIG. 1, an inside portion of the transmission 2 is schematically shown in skeleton form.

An output from an engine (i.e., a drive source) is input in an input shaft 4 (i.e., a rotational power input shaft) of the transmission 2. An input side of a first clutch C1 and an input side of a second clutch C2 are connected to the input shaft 4 via a torsional damper TD. An output shaft A1 for the first clutch (hereinafter, referred to as "first clutch output shaft A1") is connected to an output side of the first clutch C1, and an output shaft A2 for the second clutch (hereinafter, referred to as "second clutch output shaft A2") is connected to an output side of the second clutch C2. The second clutch output shaft A2 is provided coaxially with, and so as to surround, the first clutch output shaft A1. Further, a counter shaft A3 is provided in parallel with the clutch output shafts A1, A2, and an output shaft A4 (i.e., a rotational power output shaft) is provided coaxially with the clutch output shafts A1, A2, and on an extended line thereof.

The clutch C1 is driven by a hydraulic driving mechanism PC1 using a release cylinder and a master cylinder. The clutch C2 is driven by a hydraulic driving mechanism PC2 using a release cylinder and a master cylinder. The hydraulic driving mechanism PC1 is formed so as to reduce the pressing force of diaphragm spring DS1 which generates an urging force in a direction that engages the clutch C1 by increasing a hydraulic pressure in the release cylinder, thereby disengaging the clutch C1. The hydraulic driving mechanism PC2 is formed so as to reduce the pressing force of diaphragm spring DS2 which generates an urging force in a direction that engages the clutch C2 by increasing a hydraulic pressure in the release cylinder, thereby disengaging the clutch C2. Accordingly, the hydraulic driving mechanism PC1 can effectuate the pressing force of the diaphragm spring DS1 by reducing the hydraulic pressure in the release cylinder so as to engage the clutch C1. The hydraulic driving mechanism PC2 can effectuate the pressing force of the diaphragm spring DS2 by reducing the hydraulic pressure in the release cylinder so as to engage the clutch C2.

A first speed drive gear I1 is fixed to the first clutch output shaft A1. A third speed drive gear I3 and a fifth speed drive gear I5 are rotatably fitted to the first clutch output shaft A1. A first sleeve S1 is fitted to the first clutch output shaft A1 so as to be slidable in an axial direction. The first sleeve S1 is selectively engaged with the third speed drive gear I3 or the fifth speed drive gear I5 by being hydraulically driven so as to selectively couple the third speed drive gear I3 or the fifth speed drive gear I5 with the first clutch output shaft A1. Further, when the first sleeve S1 is not engaged with either the third speed drive gear I3 or the fifth speed drive gear I5, the third speed drive gear and the fifth speed drive gear are maintained in a neutral state.

A reverse drive gear IR, and a second speed drive gear I2 are fixed to the second clutch output shaft A2. A fourth speed drive gear I4 and a sixth speed drive gear I6 are rotatably fitted to the second clutch output shaft A2. A second sleeve S2 is fitted to the second clutch output shaft A2 so as to be slidable in the axial direction. The second sleeve S2 is selectively engaged with the fourth speed drive gear I4 or the sixth speed drive gear I6 by being hydraulically driven so as to selectively couple the fourth speed drive gear I4 or the sixth speed drive gear I6 with the second clutch output shaft A2. Further, when the second sleeve S2 is not engaged with either the fourth speed drive gear I4 or the sixth speed drive gear I6, the neutral state is maintained regarding the fourth speed drive gear I4 and the sixth speed drive gear I6.

A third speed driven gear O3, a fourth speed driven gear O4, a fifth speed driven gear O5, and a sixth speed driven gear O6 are fixed to the counter shaft A3. A reverse driven gear OR, a first speed driven gear O1, and a second speed driven gear O2 are rotatably fitted to the counter shaft A3. Further, a third sleeve S3, and a fourth sleeve S4 are fitted to the counter shaft A3 so as to be slidable in the axial direction. The third sleeve S3 engages with/disengages from the first speed driven gear O1 by being hydraulically driven so as to selectively realize a state in which the first speed driven gear O1 is coupled with the counter shaft A3 or the neutral state in which the first speed driven gear O1 is not coupled with the counter shaft A3. The fourth sleeve S4 is selectively engaged with the reverse driven gear OR or the second speed driven gear O2 by being hydraulically driven so as to selectively couple the reverse driven gear OR or the second speed driven gear O2 with the counter shaft A3. Further, when the fourth sleeve S4 is not engaged with either the reverse driven gear OR or the second speed driven gear O2, the neutral state is maintained regarding the reverse driven gear OR and the second speed driven gear O2.

Between the first clutch output shaft A1 and the counter shaft A3, the first speed drive gear I1 and the driven gear O1 are in constant engagement, the third speed driven gear I3 and the third speed drive gear O3 are in constant engagement, and the fifth speed drive gear I5 and the fifth speed driven gear O5 are in constant engagement. Between the second clutch output shaft A2 and the counter shaft A3, the second speed drive gear I2 and the second speed driven gear O2 are in constant engagement, the fourth speed drive gear I4 and the fourth speed driven gear O4 are in constant engagement, and the sixth speed drive gear I6 and the sixth speed driven gear O6 are in constant engagement. Further, between the second clutch output shaft A2 and the counter shaft A3, the reverse drive gear IR and the reverse driven gear OR are in constant engagement via a reverse idler gear MR.

Therefore, when both the first sleeve S1 and the third sleeve S3 are in the neutral state, the first clutch output shaft A1 and the counter shaft A3 do not operate in accordance with each other. When both the second sleeve A2 and the fourth sleeve S4 are in the neutral state, the second clutch output shaft A2 and the counter shaft A3 do not operate accordance with each other.

The output shaft A4 outputs rotational power to the wheel side when rotational power is transmitted from a drive gear G1, which is fixed to the counter shaft A3, to the output shaft A4 via a fixedly provided driven gear G2.

FIG. 2 shows operating states of the first clutch C1, the second clutch C2, the first sleeve S1, the second sleeve S2, the third sleeve S3, and the fourth sleeve S4 in each shift speed of the transmission 2. In the drawing, a circle under the first clutch C1 or the second clutch C2 signifies that the clutch is engaged in the corresponding shift speed so as to transmit rotational power. An "X" under the first clutch C1 or the second clutch C2 signifies that the clutch is disengaged in the corresponding shift speed. Engagement of the sleeves S1 with the drive gears I3 or O1 is denoted by a reference number "I3" or "O1", respectively. Similarly, engagement of the sleeves S2 to S4 with the drive gears I4, I5, I6 or the driven gears O1, O2, OR is denoted by a reference number "I4", "I5", "I6", "O1", "O2" or "OR", respectively. The neutral state in which any of the sleeves is not engaged with any of the gears is shown by a reference character "N".

Figure 3:
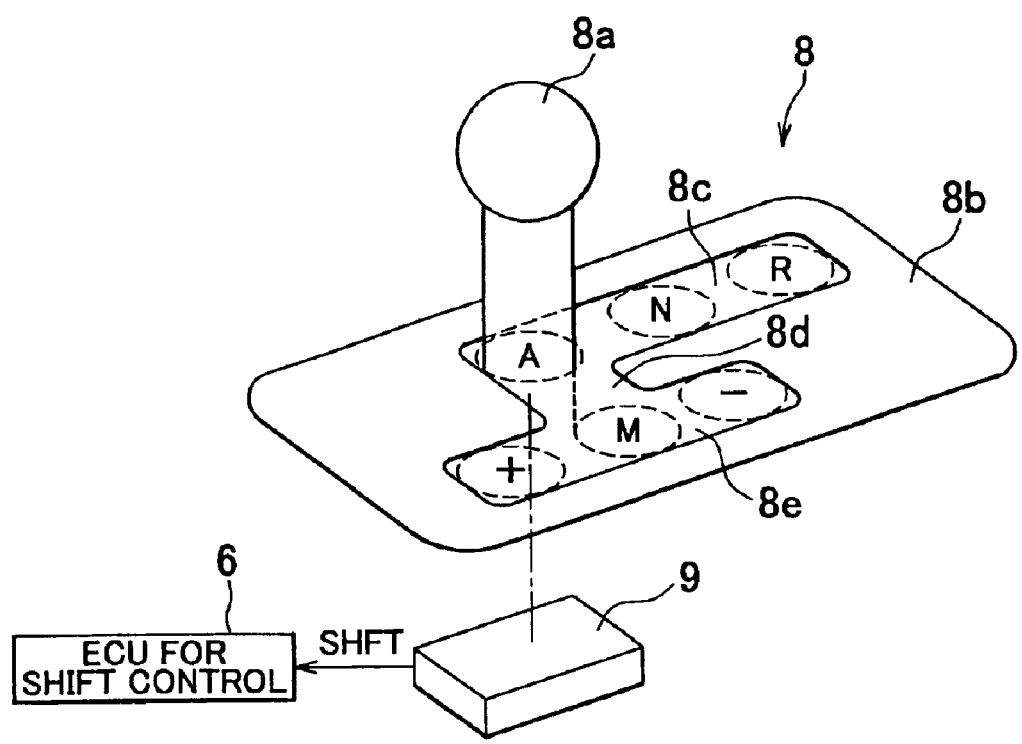
FIG. 3 is a view schematically showing a configuration of a shift control device according to the first embodiment.

The shift speed is selected and set according to the driver's operation on a shift operation device 8 (i.e., a shift operation mechanism) shown in FIG. 3. In the shift operation device 8, when a shift lever 8a is moved in shift gates 8c, 8d, 8e which are formed in a panel 8b, a shift position SHFT is detected by a shift switch 9 provided in an internal portion. A reverse position "R", a neutral position "N" and an automatic shift position "A" are provided in the first shift gate 8c among the shift gates 8c, 8d, 8e. The second shift gate 8d extending perpendicularly from the automatic shift position "A" is perpendicularly connected to the third shift gate 8e. The third shift gate 8e is formed as a sequential shift position for manual shifting, and an upshift position "+", and a downshift position "−" are provided at end portions of the third shift gate 8e. Between the upshift position "+" and the downshift position "−", a manual shift position "M" is provided. The second shift gate 8d is connected to the third shift gate 8e at the manual shift position "M".

In the third shift gate 8e, a stable stop position of the shift lever 8a is the manual shift position "M". The shift lever 8a can be moved to the upshift position "+" or the downshift position "−" according to an operation by the driver. When the driver's lever operation is completed and the driver's operating force on the shift lever 8e is reduced, the shift lever 8a is automatically returned to the manual shift position "M" by urging means such as a spring provided in the shift operation device 8.

The shift control according to the operation of the shift lever 8a is performed by controlling the hydraulic driving mechanisms PC1, PC2 and a hydraulic actuator 6a with an electric control unit 6 for shift control (hereinafter, referred to as an "ECU 6").

The ECU 6 sets the transmission 2 in reverse when the driver operates the shift lever 8a to the position "R", sets the transmission 2 in the neutral when the driver operates the shift lever 8a to the position "N", and performs automatic shifting according to a shift map corresponding to a predetermined shifting diagram when the driver operates the shift lever 8a to the position "A" so as to drive the transmission 2 to realize an appropriate shift speed corresponding to the running state.

When the driver operates the shift lever 8a to the position "M", the manual shifting mode is started. In the manual shifting mode, the transmission 2 is controlled so as to shift to a higher gear sequentially from the first speed to the fourth speed each time the driver operates the shift lever 8a to the upshift position "+". On the other hand, the transmission 2 is controlled so as to shift to a lower gear sequentially from the fourth speed to the first speed each time the driver operates the shift lever 8a to the downshift position "−".

In the shift control state of the first speed, the first clutch C1 is engaged, and the second clutch C2 is disengaged. Then, the first sleeve S1 is in the neutral state, the third sleeve S3 is engaged with the driven gear O1, the second sleeve S2 is in the neutral state, and the fourth sleeve S4 is in the neutral state or is engaged with the driven gear O2. In the first speed, the rotational power from the engine is transmitted to the first clutch output shaft A1 via the first clutch C1, the rotation of the first speed drive gear I1 is transmitted to the first speed driven gear O1, and the rotation of the first speed driven gear O1 is transmitted to the counter shaft A3 by engagement of the third sleeve S3. Thus, rotational power is output at a gear ratio of the first speed from the output shaft A4 via the drive gear G1 and the driven gear G2.

In the shift control state of the second speed, the first clutch C1 is disengaged and the second clutch C2 is engaged. The first sleeve S1 is in the neutral state or is engaged with the drive gear I3, the third sleeve S3 is engaged with the driven gear O1 or is in the neutral state, the second sleeve S2 is in the neutral state, and the fourth sleeve S4 is engaged with the driven gear O2. In the second speed, the rotational power from the engine is transmitted to the second clutch output shaft A2 via the second clutch C2, the rotation of the second speed drive gear I2 is transmitted to the second speed driven gear O2, and the rotation of the second speed driven gear O2 is transmitted to the counter shaft A3 by engagement of the fourth sleeve S4. Thus, rotational power is output at a gear ratio of the second speed from the output shaft A4 via the drive gear G1 and the driven gear G2.

In the shift control state of the third speed, the first clutch C1 is engaged and the second clutch C2 is disengaged. The first sleeve S1 is engaged with the drive gear I3, the third sleeve S3 is in the neutral state, the second sleeve S2 is in the neutral state or is engaged with the drive gear I4, and the fourth sleeve S4 is engaged with the driven gear O2 or is in the neutral state. In the third speed, the rotational power from the engine is transmitted to the first clutch output shaft A1 via the first clutch C1, the rotation of the first clutch output shaft A1 is transmitted to the third speed drive gear I3 by engagement of the first sleeve S1, and is transmitted from the third speed drive gear I3 to the counter shaft A3 via the third speed driven gear O3. In the third speed, rotational power is output at a gear ratio of the third speed from the output shaft A4 via the drive gear G1 and the driven gear G2.

In the shift control state of the fourth speed, the first clutch C1 is disengaged and the second clutch C2 is engaged. The first sleeve S1 is engaged with the drive gear I3 or I5, the third sleeve S3 is in the neutral state, the second sleeve S2 is engaged with the drive gear I4 and the fourth sleeve S4 is in the neutral state. In the fourth speed, the rotational power from the engine is transmitted to the second clutch output shaft A2 via the second clutch C2. Then, the rotation of the second clutch output shaft A2 is transmitted to the fourth speed drive gear I4 by engagement of the second sleeve S2, and the rotation of the fourth speed drive gear I4 is transmitted to the counter shaft A3 via the fourth speed driven gear O4. Thus, rotational power is output at a gear ratio of the fourth speed from the output shaft A4 via the drive gear G1 and the driven gear G2.

In the shift control state of the fifth speed, the first clutch C1 is engaged and the second clutch C2 is disengaged. The first sleeve S1 is engaged with the drive gear I5, the third sleeve S3 is in the neutral state, the second sleeve S2 is engaged with the drive gear I4 or I6, and the fourth sleeve S4 is in the neutral state. In the fifth speed, the rotational power from the engine is transmitted to the first clutch output shaft A1 via the first clutch C1, the rotation of the first clutch output shaft A1 is transmitted to the fifth speed drive gear I5 by engagement of the first sleeve S1, and is transmitted from the fifth speed drive gear I5 to the counter shaft A3 via the fifth speed driven gear O5. Thus, rotational power is output at a gear ratio of the fifth speed from the output shaft A4 via the drive gear G1 and the driven gear G2.

In the shift control state of the sixth speed, the first clutch C1 is disengaged and the second clutch C2 is engaged. The first sleeve S1 is engaged with the drive gear I5 or is in the neutral state, the third sleeve S3 is in the neutral state, the second sleeve S2 is engaged with the drive gear I6, and the fourth sleeve S4 is in the neutral state. In the sixth speed, the rotational power from the engine is transmitted to the second clutch output shaft A2 via the second clutch C2. The rotation of the engagement of the second sleeve S2, and the rotation of the sixth speed drive gear I6 is transmitted to the counter shaft A3 via the sixth speed driven gear O6. Thus, rotational power at a gear ratio of the sixth speed is output from the output shaft A4 via the drive gear G1 and the driven gear G2.

In the shift control state of reverse, the first clutch C1 is disengaged and the second clutch C2 is engaged. The first sleeve S1 is in the neutral state, the third sleeve S3 is in the neutral state or is engaged with the driven gear O1, the second sleeve S2 is in the neutral state, and the fourth sleeve S4 is engaged with the driven gear OR. In reverse, the rotational power from the engine is transmitted to the second clutch output shaft A2 via the second clutch C2, the rotation of the second clutch output shaft A2 is transmitted to the reverse driven gear OR via the reverse drive gear IR and the reverse idler gear MR, and then is transmitted to the counter shaft A3 by engagement of the fourth sleeve S4. Thus, rotational power is output at a gear ratio of reverse from the output shaft A4 via the drive gear G1 and the driven gear G2.

In the shift control state of the neutral, both of the clutches C1, C2 are disengaged, and all of the sleeves S1, S2, S3, S4 are in the neutral state, such that the rotational power from the engine is not output from the transmission 2 to the wheel side.

The ECU 6 includes RAM, ROM, a CPU, an input port, an output port, and various drive circuits which are connected with each other via a bidirectional bus so as to be formed mainly as a digital computer. A shift position SHFT signal from the shift operation device 8 and a sleeve position SLVP signal from a sleeve position sensor 10 which detects the positions of the sleeves S1 to S4 are input to the ECU 6. A stroke PCL 1 from a clutch stroke sensor 12 which detects a stroke amount of the clutch C1, a stroke PCL 2 signal from a clutch stroke sensor 14 which detects a stroke amount of the clutch C2, a rotational speed NA1 signal from a clutch output shaft rotational speed sensor 16 which detects a rotational speed NA1 of the clutch output shaft A1, and a rotational speed NA2 signal from a clutch output shaft rotational speed sensor 18 which detects a rotational speed NA2 of the clutch output shaft A2 are input to the ECU 6. In addition, a vehicle speed SPD signal from a vehicle speed sensor 20 which detects a rotational speed of the output shaft A4, an ignition IG signal from an ignition switch 22, an engine speed NE signal from an engine speed sensor 24, a throttle opening TA signal (or accelerator opening ACCP signal) from throttle opening sensor 26 are input to the ECU 6. Further, other signals necessary for the control are input to the ECU 6. The ECU 6 performs data communication with an ECU 28 for engine control (hereinafter, referred to as "ECU 28") so as to exchange data necessary for the control.

The ECU 6 realizes the internal state of the transmission 2 shown in FIG. 2 using the hydraulic driving mechanisms PC1, PC2 and the hydraulic actuator 6a so as to achieve the requested shift speed based on the aforementioned various information. The ECU 6 indicates information necessary for the control on a display 30 provided on a dashboard so as to notify the driver of the information, and generates an alarm using a buzzer 32 when necessary.

Figure 4:
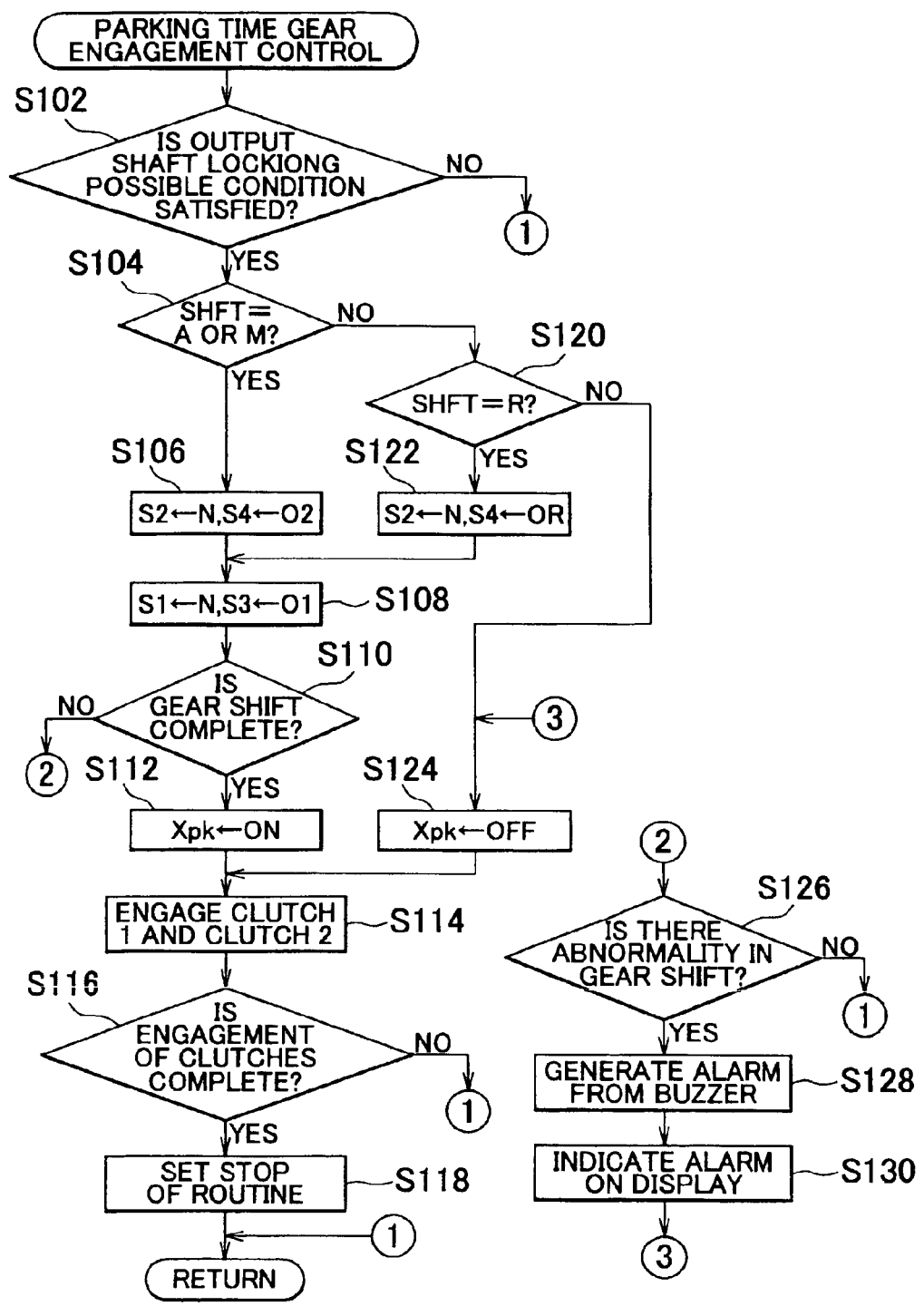
FIG. 4 is a flowchart showing the gear engagement control routine for parking performed by an ECU for shift control according to the first embodiment.

Next, control performed by the ECU 6 during parking will be described. FIG. 4 shows a flowchart of the gear engagement control routine performed during parking (hereinafter, referred to as "gear engagement control for parking"). The routine is repeatedly performed in short cycles.

When the routine is started, it is initially determined whether a condition in which the output shaft A4 can be locked (hereinafter, referred to as a "lock possible condition") is satisfied (S102). The lock possible condition is satisfied when the vehicle speed SPD is lower than a threshold value for determining whether the vehicle is stopped, the rotational speed NA1 of the first clutch output shaft A1 is lower than a threshold value for determining whether the rotation of the output shaft A1 is stopped, the rotational speed NA2 of the second clutch output shaft A2 is lower than a threshold value for determining whether the rotation of the output shaft A2 is stopped, and the ignition IG signal is in "OFF". The fact that the ignition IG signal is in "OFF" corresponds to the condition in which the rotational power from the drive source has not reached the rotational power input shaft. The fact that the vehicle speed SPD is lower than the threshold value corresponds to the condition in which the vehicle is not running.

When the lock possible condition is not satisfied ("NO" in S102), the routine temporarily ends on the assumption that a precondition for parking is not satisfied. When the engine is being operated at this time, the shift control shown in FIG. 2A is performed by the control which is performed separately by the ECU 6.

When the driver stops the vehicle, turns the ignition "OFF", and the clutch output shafts A1, A2 stop rotating, the lock possible condition is satisfied ("YES" in S102). Next, it is determined whether the shift position SHFT detected by the shift operation device 8 is either "A" (automatic shifting) or "M" (manual shifting) (S104). When it is determined that the shift position SHFT is either "A" or "M" ("YES" in S104), the hydraulic actuator 6a is driven such that the second sleeve S2 is in the neutral state, and the fourth sleeve S4 is engaged with the second driven gear O2 (S106). Thus, the shifting gear in the second clutch output shaft S2 is made to be in a state corresponding to the second speed.

Next, the hydraulic actuator 6a is driven such that the first sleeve S1 is in the neutral state, and the third sleeve S3 is engaged with the first speed driven gear O1 (S108). Thus, the shifting gear in the first clutch output shaft A1 is made to be in a state corresponding to the first speed.

Next, it is determined by the sleeve position sensor 10 whether the gear shift is complete, that is, whether the corresponding shifting gear engagement is realized by the driving control in steps S106, S108 (S110). When it is determined that the gear shift is not complete ("NO" in S110), it is determined whether there is an abnormality in the gear shift (S126). For example, it is determined that there is an abnormality in the gear shift when the gear shift is not completed when an abnormality determining time (e.g., one second) has elapsed because the routine is repeated while the shifting gear engagement by the sleeves S1 to S4 is incomplete due to lock up. When the abnormality determining time has not elapsed ("NO" in S126), the routine temporarily ends. As long as an affirmative determination is made in step S102, an affirmative determination is made in step S104, a negative determination is made in step S110, and a negative determination is made in step S126 in the following control cycles, steps S106, S108 are repeated. When the gear shift is completed before it is determined in step S126 that there is an abnormality ("YES" in S110), a parking flag Xpk is set to "ON" (S112). The information that the parking flag Xpk is "ON" is stored in the backup RAM in the ECU 6, and is indicated on the display 30 when the power is turned on by the driver. The information is then referred to during the engine start, and is reflected in the engagement/disengagement of the clutches C1, C2 and the states of the sleeves S1 to S4.

Next, the hydraulic driving mechanisms PC1, PC2 are driven such that both of the clutches C1, C2 are engaged (S114). Thus, each of the clutches C1, C2 is driven so as to be engaged. Then, it is determined by the clutch stroke sensors 12, 14 whether the engagement of each of the clutches C1, C2 is complete (S116). When the engagement is being performed ("NO" in S116), the routine temporarily ends. When step S114 is repeated in the following control cycles and the engagement of each of the clutches C1, C2 is complete ("YES" in S116), the parking time gear engagement control is set to stop (S118), after which the routine ends. The periodically repeating control is stopped by performing step S118. When the power is turned "OFF" by the ECU 6 or the ECU 28, an electric hydraulic pump which supplies operating hydraulic pressure to the hydraulic actuator 6a and the hydraulic driving mechanisms PC1, PC2 is stopped.

When it is determined that there is an abnormality in the gear shift ("YES" in S126), an alarm is generated by the buzzer 32 (S128), and an alarm showing that there is an abnormality in the gear shift is indicated on the display 30 (S130). Thus, the driver is notified that parking by locking the shifting gears is not being performed properly. Then, the parking flag Xpk is set to "OFF" (S124), and steps S114 to S118 are performed.

Meanwhile, when the shift position SHFT is neither "A" nor "M" ("NO" in S104), it is determined whether the shift position SHFT is "R" (reverse) (S120). When it is determined that the shift position SHFT is "R" ("YES" in S120), the hydraulic actuator 6a is driven such that the second sleeve S2 is controlled to be in the neutral state and the fourth sleeve S4 is engaged with the reverse driven gear OR (S122). Thus, the shifting gear of the second clutch output shaft A2 is made to be in a state corresponding to reverse.

Then, as mentioned above, the hydraulic actuator 6a is driven such that the first sleeve S1 is in the neutral state, and the third sleeve S3 is engaged with the first speed driven gear O1 (S108). Thus, the shifting gear of the first clutch output shaft A1 is made to be in a state corresponding to the first speed. Step S110 and the following steps are performed as described above.

When the shift position SHFT is neither "A" nor "M" ("NO" in S104), and the shift position SHFT is not "R", ("NO" in S120), the shift position SHFT is "N" (neutral). Therefore, all the sleeves S1 to S4 are in the neutral state in the shift control shown in FIG. 2A before an affirmative determination is made in step S102.

In this case, since parking by locking the shifting gears is not performed, the parking flag Xpk is set to "OFF" (S124), and steps S114 to S118 are performed.

In the gear engagement control for parking (FIG. 4), the aforementioned control is performed such that in the case where parking is performed when the shift position SHFT is "A" or "M", the first clutch output shaft A1 is coupled with the counter shaft A3 via the first speed drive gear I1, the first speed driven gear O1, and the third sleeve S3 by gear engagement. Further, the second clutch output shaft A2 is coupled with the counter shaft A3 via the second speed drive gear I2, the second speed driven gear O2, and the fourth sleeve S4 by gear engagement. Since both of the clutches C1, C2 are engaged, the counter shaft A3 cannot rotate. Therefore, the output shaft A4 cannot rotate, and the wheels cannot rotate.

In the case where parking is performed when the shift position SHFT is "R", the first clutch output shaft A1 is coupled with the counter shaft A3 via the first speed drive gear I1, the first speed driven gear O1, and the third sleeve S3 by gear engagement. Further, the second clutch output shaft A2 is coupled with the counter shaft A3 via the reverse drive gear IR, the reverse idler gear MR, the reverse driven gear OR and the fourth sleeve S4 by gear engagement. Since both of the clutches C1, C2 are engaged, the counter shaft A3 cannot rotate, the output shaft A4 cannot rotate, and the wheels cannot rotate.

In the case where parking is performed when the shift position SHFT is "A" or "M", the gear engage in the first clutch output shaft A1 corresponds to the first speed, the gear engagement in the second clutch output shaft A2 corresponds to the second speed. Accordingly, during restart of the engine, when both of the clutches C1, C2 are disengaged, the engine is started, and the vehicle then takes off from a standstill, the vehicle can take off in the first speed only by engaging the first clutch C1. Further, during an upshift, the shift speed can be changed to the second speed only by engaging the second clutch C2.

In the case where parking is performed when the shift position SHFT is "R", the gear engagement in the first clutch output shaft A1 corresponds to the first speed, and the gear engagement in the second clutch output shaft A2 corresponds to reverse. Accordingly during restart of the engine, when both of the clutches C1, C2 are disengaged, the engine is started, and the vehicle is then backed up, the vehicle can be backed up only by engaging the second clutch C2. The vehicle can start in the first speed only by engaging the first clutch C1 when starting forward after backing up or when first starting forward from a standstill (refer to FIG. 2B).

According to the first embodiment, the following effects can be obtained.

(A) When the output shaft A4 can be locked ("YES" in S102), the shifting gear is engaged in each of the shifting mechanisms of both of the rotational mechanisms (S106, S122, S108), and each of the clutches C1, C2 of the rotational mechanisms is engaged (S114). Therefore, the gears whose gear ratios are different from each other are coupled with each other via the clutches C1, C2. Accordingly, the gears cannot rotate in the rotational mechanisms, and, in accordance with this, the output shaft A4 cannot rotate.

Thus, it is possible to lock the output shaft A4 so as to fix the wheels by engaging the shifting gear, without providing a lock mechanism, in the twin clutch type transmission 2. In addition, unlike the conventional double engagement method, the shifting gears are engaged in the different rotational clutch output shafts A1, A2. Accordingly, the shifting gear engagement in each of the clutch output shafts A1, A2 can be used as it is at the start of running depending on the type of the engaged shifting gears. Accordingly, when the shifting gear engagement is thus used, control for starting from a standstill becomes easier.

(B) A condition in which rotational power output shaft can be locked (hereinafter, referred to as a "rotational power output shaft lock possible condition") in step S102 is satisfied when it is determined that the vehicle speed SPD, the rotational speed NA1 of the clutch output shaft A1, and the rotational speed NA2 of the clutch output shaft A2 are all zero, and that the engine operation is stopped.

Therefore, it is possible to engage the shifting gears in both of the clutch output shafts A1, A2 and engage both of the clutches C1, C2 without fear of interference with the engine and vehicle running.

(C) In the state where the rotational power output shaft lock possible condition in step S102 is satisfied, when the shift lever 8a is in one of the positions "A", "M", and "R", it can be estimated that the driver is attempting to perform parking by locking the shifting gears by engaging the shifting gears.

Accordingly, the output shaft A4 is locked by engaging the shifting gears in the different clutch output shafts A1, A2, and by engaging each of the clutches C1, C2. Thus, it is possible to appropriately perform parking by locking the shifting gears, that reflects the driver's intention.

(D) In the case where parking is performed when the shift position SHFT is either "A" or "M", engagements of the shifting gears in the different clutch output shafts A1, A2 are set to the first speed and the second speed. Accordingly, it is possible to perform the shifting gear engagement at take off and during the next shift only by engaging/disengaging each of the clutches C1, C2 without changing the shifting gear.

In the case where parking is performed when the shift position SHFT is "R", the engagements of the shifting gears in different clutch output shafts A1, A2 are set to reverse and the first speed. Accordingly, as mentioned above, it is possible to engage the shifting gear for take off in reverse and switch to the forward running or take off only by engaging/disengaging each of the clutches C1, C2 without changing the shifting gear. Accordingly, operability at take off of the vehicle is enhanced.

(E) The ECU 6 estimates the driver's intention for performing parking by locking the shifting gears and performs shifting gear engagement in different rotational mechanisms based on the vehicle speed SPD, the rotational speeds NA1, NA2 of the clutch output shafts A1, A2, the ignition IG signal, and the range position of the shift lever 8a. Therefore, it is possible to perform parking by locking the shifting gears without using a special device for triggering parking by locking the shifting gears.

[Other Embodiments]

(a) When determining whether the output shaft lock possible condition is satisfied (S102) in the parking time gear engagement control (FIG. 4), the state of the gear lock parking mode permitting switch may be determined in addition to the vehicle speed SPD, the rotational speeds NA1, NA2 of the clutch output shafts A1, A2, and state of the ignition IG signal. The gear lock parking mode permitting switch is provided separately, for example, in the shift operation device 8. When the gear lock parking mode permitting switch is "OFF", a negative determination is reliably made in step S102 such that parking by locking the shifting gears cannot be performed. In the case where the gear lock parking mode permitting switch is "ON", an affirmative determination is made in step S102 when the other conditions are satisfied such that parking by locking the shifting gears can be performed.

In the case where the gear lock parking mode permitting switch is "ON", when the output shaft lock possible condition is satisfied in step S102, parking by locking the shifting gears may be performed by engaging, for example, the gears for the first speed and the second speed or by engaging the gears for the first speed and reverse, regardless of the state of the shift lever.

In the case where the gear lock parking mode can be selected by the shift lever, without providing the gear lock parking mode permitting switch, when the shift lever is in the gear lock parking mode, parking by locking the shifting gears can be performed by engaging the gears for, for example, the first speed and the second speed, or by engaging the gears for the first speed and reverse.

(b) In the embodiment, the engine used as a drive source may be an internal combustion engine, an electric motor, or a drive source of another system such as a hybrid engine.

(c) The shift operation mechanism is not limited to the shift operation device in which a shift lever is provided that is mentioned in the embodiment. The shift operation mechanism may be a paddle type shift operation device provided in a steering wheel or a steering column, or may be a switch type shift operation device.

(d) In the embodiment, the gear engagement in the parking time gear engagement control (FIG. 4) is the combination of the first speed and the second speed, or the combination of the first speed and reverse. However, another combination may be adopted as long as the gear engagement is performed in the different clutch output shafts A1, A2. The combination of gear engagement may be the first speed and the fourth speed or first speed and the sixth speed. Also, instead of the first speed, the third speed or the fifth speed may be used. The combination of the gear engagement may be either of the third speed or the fifth speed, and one of the second speed, the fourth speed, the sixth speed or reverse.

In the embodiment, the combination of the shift speeds is different when the shift position SHFT is "M" or "A" than when the shift position SHFT is "R". However, the combination may be the same. For example, when the shift position SHFT is any of "M", "A", and "R", the combination may be the first speed and reverse. Thus, when the vehicle is started after restarting the engine, both forward running and reverse running can be performed without changing the sleeves.

The combination of the gear engagement may be the first speed and reverse on the assumption that the vehicle will be backed up after parking when the shift position SHFT is "M" or "A". Further, the combination of the gear engagement may be the first speed and the second speed on the assumption that the vehicle will take off forward after parking when the shift position SHFT is "R".

(e) The embodiment is the twin clutch type six speed transmission including two rotational mechanisms.

However, a transmission including three or more rotational mechanisms may be employed. Parking by locking the shifting gears can be performed by performing the gear engagement and the engagement of the clutch in at least two of the three or more rotational mechanisms. Of course, parking by locking the shifting gears may be performed by performing gear engagement and the engagement of the clutch in three or more rotational mechanisms.

(f) In the embodiment, the shifting gears for the clutch output shafts A1, A2 is classified into two groups, one of which includes the first speed, the third speed and the fifth speed, and the other of which includes reverse, the second speed, the fourth speed and the sixth speed. However, the shifting gears for the clutch output shafts A1, A2 may be arranged by another classification of the shifting gears. For example, the shifting gears for the clutch output shafts A1, A2 may be classified into two groups, one of which includes reverse, the first speed, the third speed, the fifth speed and a seventh speed, and the other of which includes the second speed, the fourth speed, and the sixth speed.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An output shaft locking device in a multi-clutch transmission in which a plurality of rotational mechanisms, each of which is formed by arranging a clutch and a shifting mechanism in series, is provided in parallel between a rotational power input shaft and a rotational power output shaft, comprising:
   a locking control device which locks the rotational power output shaft by engaging a shifting gear in each of the shifting mechanisms of at least two of the rotational mechanisms and engaging the clutches of the rotational mechanisms having the shifting gear engaged by the locking control device;
   a rotational power output shaft lock determining device which determines whether the rotational power output shaft can be locked, wherein the locking control device locks the rotational power output shaft when it is determined by the rotational power output shaft lock determining device that the rotational power output shaft can be locked, wherein the multi-clutch transmission is a transmission in a vehicle, which transmits rotational power from a drive source to a wheel of the vehicle, and the rotational power output shaft lock determining device determines that the rotational power output shaft can be locked when predetermined conditions are satisfied, the predetermined conditions including a condition that the rotational power from the drive source is not being transmitted to the rotational power input shaft and a condition that the vehicle is not running.

2. The output shaft locking device in the multi-clutch transmission according to claim 1, wherein the shifting mechanism of the at least two of the rotational mechanisms electrically controls a change in a shift according to a shift operation by a driver.

3. The output shaft locking device according to the multi-clutch transmission according to claim 1, wherein the clutches of the at least two of the rotational mechanisms are engaged/disengaged electrically.

4. The output shaft locking device in the multi-clutch transmission according to claim 1, wherein shifting gear engagement corresponding to a first speed is included in shifting gear engagement performed by the locking control device.

5. The output shaft locking device in the multi-clutch transmission according to claim 1, wherein, when changing a shift speed, the multi-clutch transmission switches the shifting mechanism, which is included in the rotational mechanism that can realize a requested shift speed among the rotational mechanisms in which the clutch has been disengaged, to a gear ratio state corresponding to the requested shift speed, then disengages the clutch which is included in the rotational mechanism in which the clutch has been engaged so as to transmit the rotational power, and engages the clutch included in the rotational mechanism which can realize the requested shift speed, thereby changing the shift speed.

6. The output shaft locking device in the multi-clutch transmission according to claim 5, wherein the shift change is performed according to a shifting mode selected by a shift operation mechanism operated by a driver, at least an automatic gear shift position, a manual gear shift position, a reverse position and a neutral position are provided for the shift operation mechanism, and the locking control device engages the shifting gear in each of the shifting mechanisms of at least two of the rotational mechanisms and engages each of the clutches of the rotational mechanisms when it is determined by the rotational power output shaft lock determining device that the rotational power output shaft can be locked and the shift operation mechanism is instructed to be in one of the automatic gear shift position, the manual gear shift position and the reverse position.

7. The output shaft locking device in the multi-clutch transmission according to claim 6, wherein, in a case where the shift operation mechanism is instructed to be in the automatic gear shift position or the manual gear shift position, when engaging the shifting gear in each of the shifting mechanisms of at least two of the rotational mechanisms, the locking control device engages the shifting gear corresponding to the first speed.

8. The output shaft locking device in the multi-clutch transmission according to claim 6, wherein, in a case where the shift operation mechanism is instructed to be in the reverse position, when engaging the shifting gear in each of the shifting mechanisms of at least two of the rotational mechanisms, the locking control device engages the shifting gear corresponding to reverse.

9. An output shaft locking method in a multi-clutch transmission in which a plurality of rotational mechanisms, each of which is formed by arranging a clutch and a shifting mechanism in series, is provided in parallel between a rotational power input shaft and a rotational power output shaft, comprising the steps of:
   engaging a shifting gear in each of the shifting mechanisms of at least two of the rotational mechanisms;
   engaging the clutches of the rotational mechanisms having the shifting gears engaged in the step of engaging a shifting gear in each of the shifting mechanisms of at least two of the rotational mechanisms, thereby locking the rotational power output shaft; and
   determining that the rotational power output shaft can be locked when predetermined conditions are satisfied, the predetermined conditions including a condition that the rotational power from the drive source is not being transmitted to the rotational power input shaft, and a condition that the vehicle is not running.

10. The output shaft locking method according to claim 9, wherein the shifting mechanism of the at least two of the rotational mechanisms electrically controls a change in a shift according to a shift operation by a driver.

11. The output shaft locking method according to claim 9, wherein the clutches of the at least two of the rotational mechanisms are engaged/disengaged electrically.

12. The output shaft locking method according to claim 9, wherein shifting gear engagement corresponding to a first speed is included in shifting gear engagement performed by the locking control device.

13. The output shaft locking method according to claim 9, further comprising the steps of:

disengaging the clutch which is included in the rotational mechanism in which the clutch has been engaged so as to transmit the rotational power after switching the shifting mechanism, which is included in the rotational mechanism that can realize a requested shift speed among the rotational mechanisms in which the clutch has been disengaged, to the gear ratio state corresponding to the requested shift speed when changing a shift speed; and engaging the clutch included in the rotational mechanism which can realize the requested shift speed, thereby changing the shift speed.

14. The output shaft locking method according to claim 13, wherein the shift change is performed according to a shifting mode selected by a shift operation mechanism operated by a driver, and at least an automatic gear shift position, a manual gear shift position, a reverse position and a neutral position are provided for the shift operation mechanism, further comprising the steps of:

engaging the shifting gear in each of the shifting mechanisms of at least two of the rotational mechanisms when it is determined by the rotational power output shaft lock determining device that the rotational power output shaft can be locked and the shift operation mechanism is instructed to be in one of the automatic gear shift position, the manual gear shift position and the reverse position; and engaging each of the clutches of the rotational mechanisms.

15. The output shaft locking method according to claim 14 further comprising the step of:

engaging the shifting gear corresponding to the first speed when engaging the shifting gear in each of the shifting mechanisms of at least two of the rotational mechanisms in a case where the shift operation mechanism is instructed to be in the automatic gear shift position or the manual gear shift position.

16. The output shaft locking method according to claim 14, further comprising the step of:

engaging the shifting gear corresponding to reverse when engaging the shifting gear in each of the shifting mechanisms of at least two of the rotational mechanisms in a case where the shift operation mechanism is instructed to be in the reverse position.

* * * * *